Figure 1:
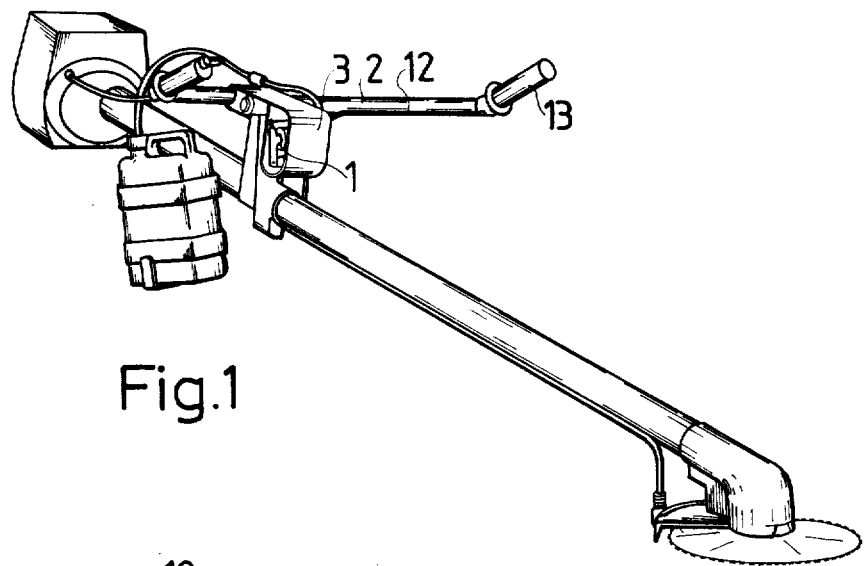

United States Patent [19]

Marttinen

[11] 4,372,047
[45] Feb. 8, 1983

[54] DISPENSING MEANS FOR SAPLING CONTROL SUBSTANCE CONNECTED WITH A LAND CLEARING SAW

[75] Inventor: Toivo Marttinen, Puntala, Finland

[73] Assignee: Enso-Gutzeit Osakeyhtiö, Helsinki, Finland

[21] Appl. No.: 215,408

[22] Filed: Dec. 11, 1980

[51] Int. Cl.³ .............................................. B27B 9/00
[52] U.S. Cl. .................................. 30/123.3; 47/1.7; 417/443
[58] Field of Search ................. 47/1.5, 1.7, 57.5; 30/123.3, 166 R, 123.4; 417/443

[56] References Cited

U.S. PATENT DOCUMENTS

| | | | |
|---|---|---|---|
| 2,106,620 | 1/1938 | Nilson | 417/443 X |
| 2,726,484 | 12/1955 | Simpkins | 30/123.3 X |
| 2,747,330 | 5/1956 | Simpkins | 30/123.3 X |
| 2,789,396 | 4/1957 | Jernander | 30/123.3 X |
| 2,870,573 | 1/1959 | Scadden | 30/123.3 X |
| 3,126,889 | 3/1964 | Blumenfeld | 30/123.3 X |
| 4,219,963 | 9/1980 | Mullett | 30/123.3 X |

*Primary Examiner*—Jimmy C. Peters
*Attorney, Agent, or Firm*—Toren, McGeady and Stanger

[57] ABSTRACT

In connection with a land clearing saw, a sapling control substance dispensing device comprising a container for the sapling control substance, a control substance nozzle and a control substance duct leading from the container to the nozzle, this duct incorporating a manually operable valve (1) comprising a piston (4) provided with return spring (11) and a cylinder (5), with ports for the control substance entry duct (6) and exit duct (7), these ducts being provided with check valves (8,18). Within the piston has been installed an auxiliary piston (14) loaded with a spring (16) and which as the piston (4) is being moved opens or closes a needle valve (9) associated with the exit duct port.

3 Claims, 2 Drawing Figures

U.S. Patent Feb. 8, 1983 4,372,047

DISPENSING MEANS FOR SAPLING CONTROL SUBSTANCE CONNECTED WITH A LAND CLEARING SAW

The present invention concerns a sapling control substance dispensing means in connection with a land clearing saw, said means comprising a container for the sapling control substance, a control substance nozzle and a control substance duct leading from the container to the nozzle, this duct including a valve comprising a piston with return spring and a cylinder presenting ports for the control substance entry duct and exit duct, and both of which have been fitted with a check valve.

The land clearing saw is used to clear hypertrophic sapling growth by cutting it with the saw. In order that the stumps might not continue to grow, sapling control substance is sprayed on the stumps in connection with the cutting operation.

The object of the present invention is to provide a new type of sapling control substance dispensing means and which is easy to operate, by which the sapling control substance is dispensed.

The dispensing means of the invention is characterized in that within the piston has been installed a spring-loaded auxiliary piston which as the piston is moved opens or closes the needle valve found in connection with the exit duct port.

It is possible, thanks to the invention, in connection with the cutting to squirt a given dose of control substance onto the stump. The cooperation of auxiliary piston and needle valve ensures that control substance cannot flow out through the control substance nozzle other than during a spraying operation.

One favourable embodiment of the invention is characterized in that the auxiliary piston has throttling orifices which connect the liquid volume defined by the cylinder and piston with the space intermediate between the pistons. Therefore the auxiliary piston may in throttled state stop after having opened the needle valve, and the liquid has free exit from the inter-piston volume out through the throttling orifices.

Another embodiment of the invention is characterized in that the auxiliary piston has a stem by mediation of which the needle valve opens and closes. Thus the opening of the needle valve has been facilitated by means of the stem.

The invention is described in the following with the aid of am example, with reference being made to the attached drawing, wherein:

FIG. 1 displays a land clearing saw to which has been attached a dispensing means according to the invention.

Figure 2:
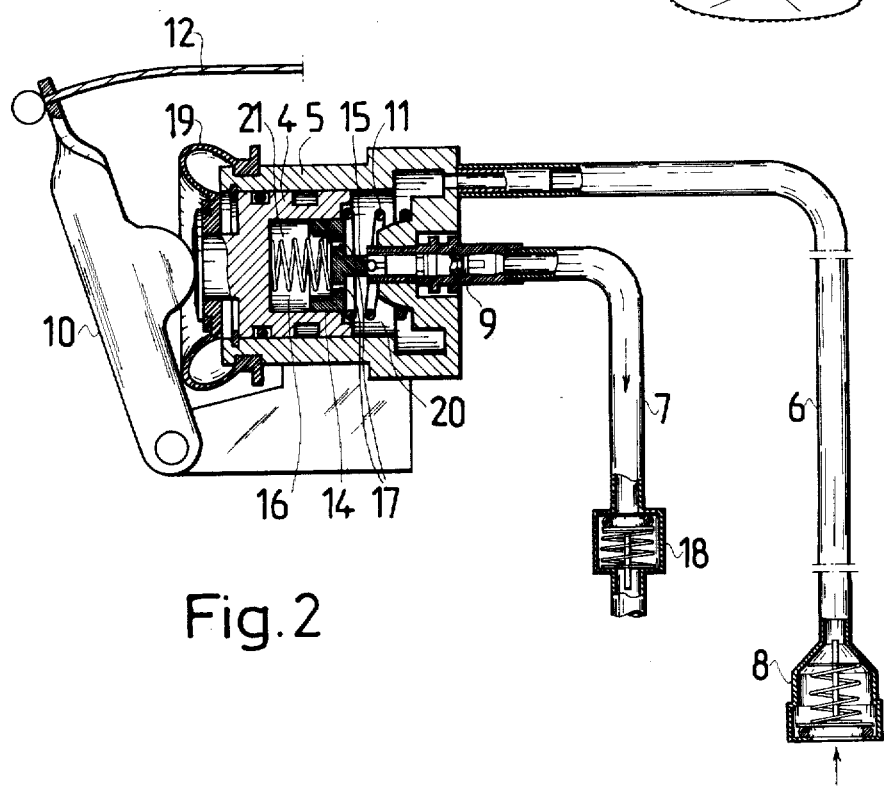

FIG. 2 shows the valve of the dispensing means, sectioned.

The manual valve 1 of the land clearing saw has been mounted on the brace of the control handle-bar 2 and covered with the protector 3. The valve 1 comprises a piston 4 and cylinder 5, with ports for the control substance entry duct 6 and exit duct 7. The ducts 6 and 7 have been provided with check valves 8 and 18. The piston can be moved, in a direction causing the cylinder volume to be reduced, by the aid of the operating lever 10, against the return spring 11. As a consequence, the control substance is forced through the exit tube and nozzle down on the stump. The operating lever 10 is connected by a wire 12 with the rotatable control grip 13 of the land clearing saw. Within the piston 4 has been installed the auxiliary piston 14, loaded by the spring 16, which as the piston is moved opens or closes the needle valve 9 found in connection with the exit duct port. The auxiliary piston 14 has throttling orifices 17 connecting the liquid volume 20 defined by the cylinder 5 and piston 4 with the interpiston space 21.

The movement of the piston 4 is used to control the liquid quantity that is sprayed, and which depends on how far the grip 13 is turned. The auxiliary piston 14 with stem 15 within the piston 4 will immediately open the needle valve 9, as the stem 15 meets the end thereof. The stem 15 keeps the needle valve 9 open until the piston 4 returns to its initial position. The auxiliary piston 14 presents, encircling the stem 15, four throttling orifices 17, through which the liquid gains access to the space behind the auxiliary piston 14, thereby adding to the quantity of liquid spray, i.e., the capacity of the cylinder 5 is employed to best advantage. The check valve 18 with compression spring prevents during the return motion of the piston 4 any liquid from being drawn back through the duct 7 into the cylinder volume. The rubber sleeve 19 prevents dust from entering the cylinder. The double piston system renders possible the use of the needle valve, whereby as the sprayed liquid meets the blade of the land clearing saw it will not impinge with excessive velocity such as would cause splashing or atomizing of the control substance. Furthermore, the needle valve prevents inadvertent flow of the liquid from the container due to capillarity.

The sapling control substance dispensing means is easy to operate, and it is easy to dispense the control substance to find the intended spot, at the proper time.

It is obvious to a person skilled in the art that various embodiments of the invention may vary within the scope of the claims following hereinbelow.

I claim:

1. Improvement in a connection with a land clearing saw, a sapling control substance dispensing means comprising a container for the sapling control substance, a control substance nozzle and a control substance duct leading from the container to the nozzle, this duct incorporating a manually operable valve comprising a piston provided with return spring and a cylinder, with ports for the control substance entry duct and exit duct, these ducts being provided with check valves, wherein the improvement comprises that within the piston has been installed an auxiliary piston loaded with a spring and which as the piston is being moved opens or closes a needle valve associated with the exit duct port.

2. Dispensing means according to claim 1, characterized in that the auxiliary piston has throttling orifices leading from the liquid volume defined by the cylinder and the piston to the space between the pistons.

3. Dispensing means according to claim 1, characterized in that the auxiliary piston has a stem by mediation of which the needle valve opens and closes.